(12) United States Patent
Ortiz

(10) Patent No.: US 10,862,389 B1
(45) Date of Patent: Dec. 8, 2020

(54) MULTIPLE-OUTPUT NON-ISOLATED ACTIVE LINE FILTER

(71) Applicant: RAYTHEON COMPANY, Waltham, MA (US)

(72) Inventor: Joe A. Ortiz, El Segundo, CA (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 16/593,926

(22) Filed: Oct. 4, 2019

(51) Int. Cl.
| | | |
|---|---|---|
| *H02M 1/42* | (2007.01) | |
| *H02M 1/15* | (2006.01) | |
| *H01F 27/28* | (2006.01) | |
| *H02M 3/335* | (2006.01) | |
| *H02M 1/00* | (2006.01) | |

(52) U.S. Cl.
CPC .............. *H02M 1/15* (2013.01); *H01F 27/28* (2013.01); *H02M 1/4225* (2013.01); *H02M 3/33576* (2013.01); *H02M 2001/008* (2013.01); *H02M 2001/009* (2013.01)

(58) Field of Classification Search
CPC ................... H02M 2001/008; H02M 2001/009
USPC ................ 323/243, 267, 271, 272, 284, 288
See application file for complete search history.

(56) References Cited

U.S. PATENT DOCUMENTS

| | | | |
|---|---|---|---|
| 4,940,929 A | 7/1990 | Williams | |
| 5,287,372 A | 2/1994 | Ortiz | |
| 5,736,881 A | 4/1998 | Ortiz | |
| 5,977,753 A | 11/1999 | Edwards et al. | |
| 6,101,108 A | 8/2000 | Wittenbreder, Jr. | |
| 6,650,554 B2 * | 11/2003 | Darshan ................. | H02H 9/001 323/207 |
| 7,019,503 B1 | 3/2006 | Ortiz | |
| 7,038,435 B2 | 5/2006 | Ortiz | |
| 7,141,940 B2 | 11/2006 | Ortiz | |
| 8,723,494 B2 | 5/2014 | Galloway | |
| 9,716,447 B2 | 7/2017 | Ortiz | |

(Continued)

FOREIGN PATENT DOCUMENTS

TW    2020/035565    9/2020

OTHER PUBLICATIONS

Dixon, Jr., et al., "High Power Factor Preregulators for Off-Line Power Supplies," Unitrode Power Supply Design Seminar; pp. 1-16; Jan. 1, 1998; XP002800202.

(Continued)

*Primary Examiner* — Gary A Nash
(74) *Attorney, Agent, or Firm* — Burns & Levinson, LLP; Joseph M. Maraia

(57) ABSTRACT

An active line filter (ALF) with multiple outputs includes a first output providing a first output power form having a first output current, the first output power form being coupled to a first winding on an inductive element; and a second output providing a second output power form having a second output current, the second output power form being coupled to a second winding on the inductive element. An input receives an input power form having an input current and an input voltage. A pulse-width modulator (PWM) provides a PWM output signal controlling timing of switching of a transistor to control application of the input voltage of the input power form to the first winding of the inductive element. An error amplifier receives a signal indicative of the first output voltage and generating an error amplifier output signal.

6 Claims, 17 Drawing Sheets

(56) References Cited

U.S. PATENT DOCUMENTS

| | | | |
|---|---|---|---|
| 2005/0110474 A1* | 5/2005 | Ortiz | H02M 3/156 323/282 |
| 2006/0043942 A1* | 3/2006 | Cohen | H02M 3/156 323/207 |
| 2006/0176029 A1 | 8/2006 | McGinty et al. | |
| 2006/0232226 A1* | 10/2006 | Ortiz | H02M 1/4225 315/291 |
| 2011/0215777 A1 | 9/2011 | Braylovskiy et al. | |
| 2012/0313646 A1 | 12/2012 | Nishikawa | |
| 2016/0006336 A1 | 1/2016 | Bennett et al. | |
| 2016/0072377 A1* | 3/2016 | Oh | H02M 1/4225 323/207 |

OTHER PUBLICATIONS

Leung et al., "A Family of Ripple Estimation-Cancellation Methods Based on Switched-Resistor Circuits and Their Application in Fast-Response PFC Preregulator," IEEE Transactions on Power Electronics; Institute of Electrical and Electronics Engineers, USA; vol. 32, No. 4; pp. 2608-2621; Apr. 1, 2017; XP011639784.

Magzan et al., "Generalized Predictive Controller Applied in Boost Converter Input Current Control," 8th European Conference on Power Electronics and Applications; Lausanne, CH; European Conference on Power Electronics and Applicatoins; EPE Association; Brussels, BE; vol. Conf. 8; Sep. 7-9, 1999; XP000890318.

Canesin et al., "A unity power factor multiple isolated outputs switching mode power supply using a single switch," Applied Power Electronics Conference and Exposition; APEC '91; Conference Proceedings; Sixth Annual Dallas, TX, USA; IEEE; pp. 430-436; Mar. 10, 1991; XP010044785.

Fang Peng et al., "Energy Channeling LED Driver Technology to Achive Flicker-Free Operation with True Single Stage Power Factor Correction," IEEE Transactions on Power Electronics; Institute of Electrical and Electronics Engineers, USA; vol. 32, No. 5; pp. 3892-3907; May 1, 2017, XP011640365.

International Search Report and Written Opinion from related PCT Application No. PCT/US2020/035565, dated Sep. 15, 2020.

International Search Report and Written Opinion from related PCT Application No. PCT/US2020/035559, dated Sep. 14, 2020.

* cited by examiner

US 10,862,389 B1

MULTIPLE-OUTPUT NON-ISOLATED ACTIVE LINE FILTER

CROSS-REFERENCE TO RELATED APPLICATIONS

This application is related to copending U.S. Application entitled "Active Line Filter Utilizing Input Current Regulation," filed on even date herewith, of common Applicant and Assignee, Ser. No. 16/593,923 the entire contents of which are incorporated herein by reference.

BACKGROUND

1. Technical Field

The present disclosure is related to active line filter circuits and, more particularly, to a multiple-output non-isolated active line filter, and to an active line filter utilizing input current regulation to a set DC level.

2. Discussion of Related Art

Electronic systems may draw pulsed or time-varying current from the system power source. For example, a laser may require large-amplitude pulsed diode array pump currents that reflect back to the input power source as pulsed input current, unless some means is used to filter the pulsed currents. In many cases, the pulsed currents exceed the capability of the power system. Until the advent of the active line filter, large and heavy passive LC filters were used to attenuate time-varying current drawn from the system power source. Conventional non-isolated converter active line filters provide only a single output power form. In many systems, such as cryocooler power systems and high-power diode drivers for laser pump arrays, multiple driving power outputs are required. In many other systems, such as high-power diode drivers for laser pump arrays, input current draw must not exceed some specified DC level.

SUMMARY

According to a fist aspect, an active line filter (ALF) with multiple outputs is provided. The ALF includes a first output providing a first output power form having a first output current for charging a first energy storage capacitor to a first output voltage for storing energy to be provided to a first load, the first output power form being coupled to a first winding on an inductive element; and a second output providing a second output power form having a second output current for charging a second energy storage capacitor to a second output voltage for storing energy to be provided to a second load, the second output power form being coupled to a second winding on the inductive element, such that the first and second output power forms are coupled via the inductive element. An input receives an input power form having an input current and an input voltage. A pulse-width modulator (PWM) provides a PWM output signal controlling timing of switching of a transistor to control application of the input voltage of the input power form to the first winding of the inductive element. An error amplifier receives a signal indicative of the first output voltage and generating an error amplifier output signal.

In some exemplary embodiments, the ALF comprises a non-isolated converter.

In some exemplary embodiments, the ALF further comprises a summing circuit for summing at least two summed signals to generate a summed output signal, the at least two summed signals including the input voltage of the input power form and the error amplifier output signal.

According to another aspect, a method of providing power in an active line filter (ALF) with multiple outputs is provided. The method includes: providing a first output power form having a first output current for charging a first energy storage capacitor to a first output voltage for storing energy to be provided to a first load, the first output power form being coupled to a first winding on an inductive element; providing a second output power form having a second output current for charging a second energy storage capacitor to a second output voltage for storing energy to be provided to a second load, the second output power form being coupled to a second winding on the inductive element, such that the first and second output power forms are coupled via the inductive element; receiving an input power form having an input current and an input voltage; controlling timing of switching of a transistor with a pulse-width modulator (PWM) output signal to control application of the input voltage of the input power form to the first winding of the inductive element; and receiving a signal indicative of the first output voltage and generating an error amplifier output signal.

In some exemplary embodiments, the ALF comprises a non-isolated converter.

In some exemplary embodiments, the method further comprises summing at least two summed signals to generate a summed output signal, the at least two summed signals including the input voltage of the input power form and the error amplifier output signal.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
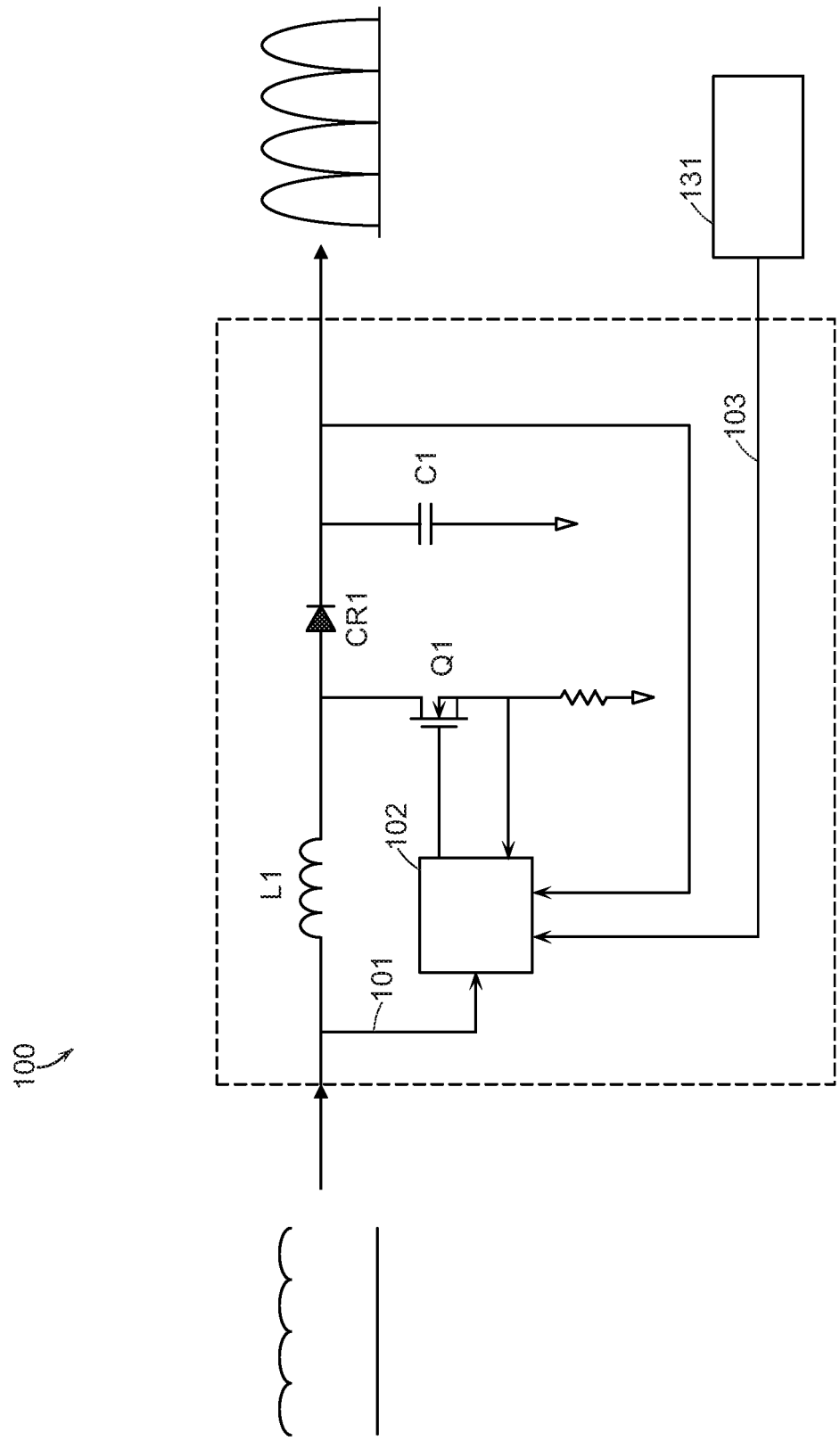
FIG. 1 includes a schematic block diagram of an active filter boost converter.

An active filter is a circuit that uses active elements, for example, semiconductor devices such as integrated circuits, transistors, etc., in a configuration such that the output of the circuit is modified (amplified or attenuated) over a frequency range relative to the input signal, specifically, the circuit functions as a filter. The active filter can be implemented to provide attenuation of the input signal over a desired frequency range. Active filters can also provide voltage gain over a desired frequency range rather than attenuation. Active filters can be implemented to provide bandpass, band-reject, high-pass, or low-pass filter characteristics. A significant advantage of an active filter is the significantly reduced size and weight, with reduced cost, and improved performance and predictability over a passive filter.

An active line filter (ALF) is an active filter that provides attenuation of the power line ripple current (or pulsed current) drawn from the ALF output, such that the ripple current (or pulsed current) reflected back to the power source (power line) is greatly attenuated. The ALF is configured as a low pass LC filter. The ALF provides the function of a low pass LC filter with significantly reduced size and weight, reduced cost, and improved performance over an equivalent passive LC power line filter.

Active line filters are described in U.S. Pat. Nos. 7,038,435; 7,019,503; and 7,141,940; of common ownership and Applicant to the present application, the entire contents of which are incorporated herein by reference. The power converter may comprise either an isolated power converter (such as a flyback, forward, push-pull, full bridge, etc.), or a non-isolated power converter (such as a boost, buck, buck-boost, tapped buck, etc.). The non-isolated continuous current boost converter is described as an exemplary embodiment of the present invention, but the scope of the present disclosure is not limited in this respect.

According to the present disclosure, non-isolated power converter active line filters are modified by adding secondary windings to the power inductor to provide multiple output power forms. The non-isolated continuous current boost converter is discussed as an example of the present invention, but the scope of the invention is not limited in this respect. Thus, according to the present disclosure, circuit operation and all the advantages of active line filters are maintained, but multiple output power forms are provided, thus providing a significant savings in mass and volume over the use of multiple ALFs or an isolated multiple-output power converter.

According to the present disclosure, active line filters are modified by directly regulating the input current to a set specific DC level. Thus, according to the present disclosure, circuit operation and all the advantages of active line filters are maintained, not only providing an input current drawn from the power source having greatly attenuated ripple current, but also providing an input current draw that never exceeds the set specific DC level, thus never exceeding the current capability of the power source.

The single-output ALF is first described below, then the multple-output non-isolated converter ALF of the present disclosre is described, then active line filters modified to directly regulate the input current to a set specific DC level are described. Only a simple non-isolated continuous current boost converver is described for clarity, but all the previously described improvements to the ALF, and all the improvements described in this disclosure apply to the present invention.

FIG. 1 includes a schematic block diagram of an active line filter boost converter 100, which is connected to cryo electronics 131. The present disclosure utilizes a high switching frequency continuous current boost converter with a very low bandwidth control loop, with input voltage feedforward and output load feedforward, to provide an input current regulated to a DC level, with greatly attenuated ripple current, as illustrated in FIG. 1. A discontinuous current boost converter may be used, but at the cost of losing the advantage of the input current being regulated to a DC level with very little ripple current. A silicon carbide output rectifier is used to maintain high efficiency at the high switching frequency. The filter of FIG. 1 is similar to a conventional DC power supply, but whereas the typical DC power supply provides a regulated output (normally regulated DC voltage), the active filter provides a regulated input (DC input current), while delivering a regulated DC output voltage.

Continuing to refer to FIG. 1, continuous current boost converter circuit operation will be described. The pulse width modulator (PWM) and control 102 controls switch Q1. During the switch on time, the input voltage is impressed across inductor L1. Current in inductor L1 ramps up according to the equation:

$$di = \frac{(Vin - Vce)^* ton}{L};$$

where di is the change in inductor current during time ton, Vin is the voltage input to the converter, Vce is the switch transistor Q1 collector-emitter on voltage (or the drain-source on voltage), ton is the length of time the switch transistor Q1 is on, and L is the inductance of the inductor L1. It is assumed for the purpose of the present description that the voltage across the current sense resistor is negligible.

During the switch off time, inductor L1 flies back to flow current into capacitor C1. The difference between the output voltage and the input voltage is impressed across inductor L1. Current in inductor L1 ramps down according to the equation:

$$di = \frac{(Vin - Vout - Vf)^* toff}{L};$$

where di is the change in inductor current during time toff, Vin is the voltage input to the converter, Vout is the voltage output from the converter, Vf is the rectifier forward voltage drop, toff is the length of time the switch transistor Q1 is off, and L is the inductance of the inductor L1.

Under steady state conditions, di(on)+di(off)=0. Solving these simultaneous equations yields the following equation:

$$Vout = \frac{Vin}{(1-D)} - \frac{Vce}{(1-D)} - Vf;$$

where Vout is the voltage output from the converter, Vin is the voltage input to the converter, Vce is the switch transistor Q1 collector-emitter on voltage (or the drain-source on voltage), Vf is the forward voltage of the output rectifier diode CR1 during time toff while the inductor current is flowing through CR1, and D is the duty cycle of the switch, D=ton/(ton+toff). Vout is a function of the input voltage and the switch duty cycle, the transistor losses, and the diode forward voltage. Thus, D, the duty cycle of the switch, controls the output voltage.

In a current mode control converter, the switch current is compared to the error amplifier output to control the switch on time. Thus, the switch current is regulated on a cycle-by-cycle basis; a current mode control converter can be used to regulate input current. Current mode control converters, whether isolated power converters (such as a flyback, forward, push-pull, full bridge, etc.), or non-isolated power converters (such as a boost, buck, buck-boost, tapped buck, etc.) are well described in the literature. The present disclosure is directed to the application of a current mode control non-isolated converter with a very low bandwidth control loop, with input voltage feedforward and output load feedforward, to provide a regulated input current, with multiple outputs. The present disclosure is also directed to the application of a current mode control converter with a very low bandwidth control loop, with input voltage feedforward and output load feedforward, to provide an input current regulated to a set specific DC level, thus not only providing an input current drawn from the power source having greatly attenuated ripple current, but also providing an input current draw that never exceeds the set specific DC level, thus never exceeding the current capability of the power source.

It is possible to provide input current regulation by other means, but the current mode control continuous current boost converter of the present disclosure enjoys reduced complexity and cost over other approaches. For example, it is possible to directly regulate input current using a voltage mode converter, but with increased complexity and cost, while losing the advantages of current mode control. This scheme still requires a very slow voltage regulation bandwidth loop, with input voltage feedforward 101 and output load feedforward 103, for best performance. Input voltage feedforward only can be used, if output load feedforward is not available, with a drop in circuit performance. Output load feedforward only can be used, but with a drop in circuit performance.

As defined, the active filter provides a regulated DC input current with very low ripple. The output current drawn has an average DC component, but also has a significant AC component. The difference between the diode current and output load current is provided by the output filter capacitors, resulting in a significant ripple current in the capacitors. For a given ripple current and a given capacitance, an AC ripple voltage results across the capacitors. The very low bandwidth voltage regulation control loop is required to prevent this capacitor ripple voltage from modulating the input current. In some particular exemplary embodiments, a loop bandwidth of <2 Hz was used. More output capacitors can be used in parallel to reduce the ripple voltage, but at the expense of size, weight, and cost.

Given the use of a very slow voltage regulation loop to provide regulation of the output voltage, input voltage transients and output load transients will cause poor output voltage regulation, due to the inability of the very slow control loop to compensate for the transients. Input voltage feedforward and output load feedforward are thus added to provide very fast response to input voltage transients and output load transients to maintain output voltage regulation to within acceptable levels.

Figure 2:
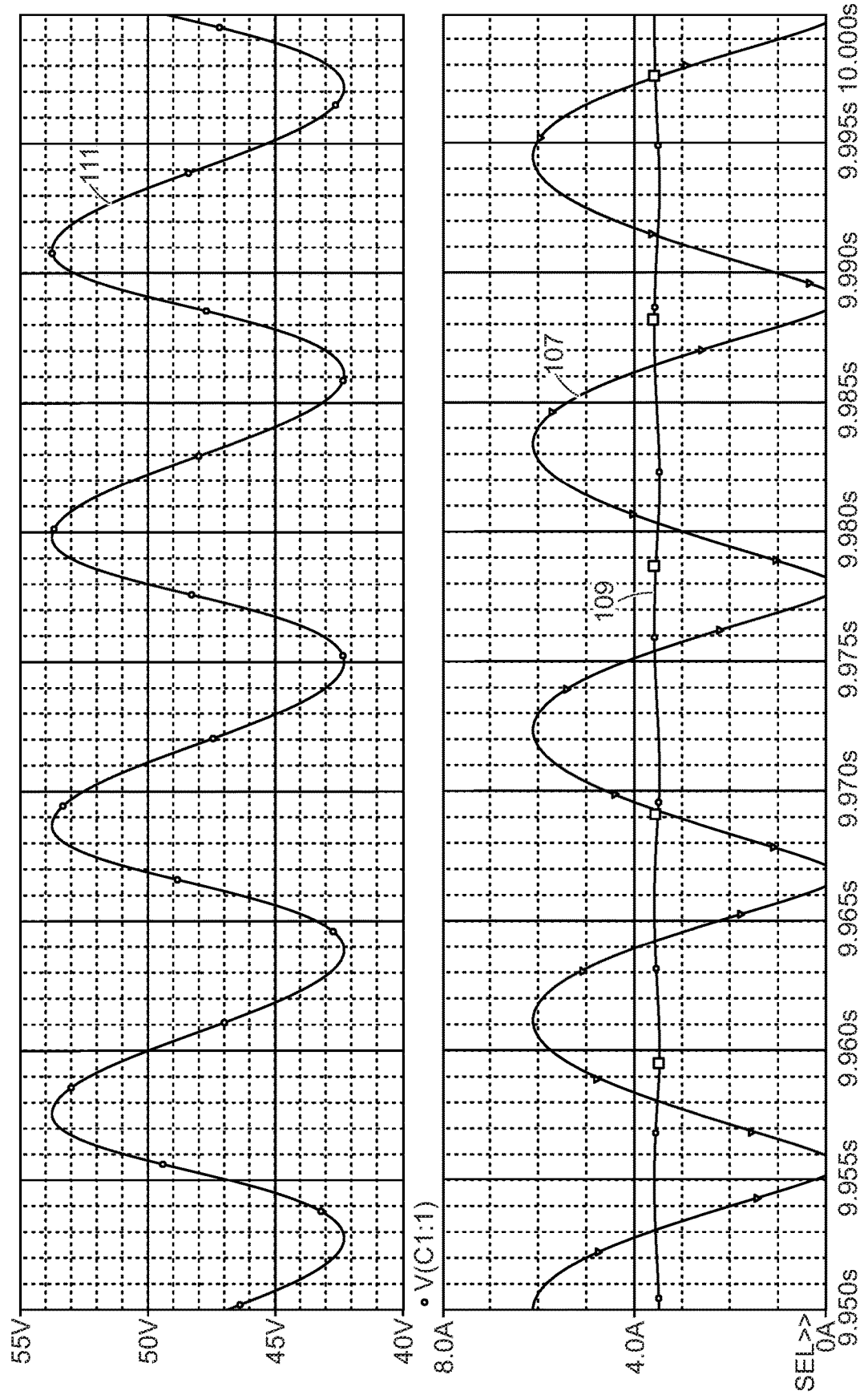
FIG. 2 includes curves reflecting circuit simulation of the active line filter (ALF) of FIG. 1.

FIG. 2 includes curves reflecting circuit simulation of ALF 100 of FIG. 1. The lower plot illustrates ouput current in curve 107 and input current in curve 109. The upper plot illustrates ouput capacitor ripple voltage in curve 111.

Figure 3:
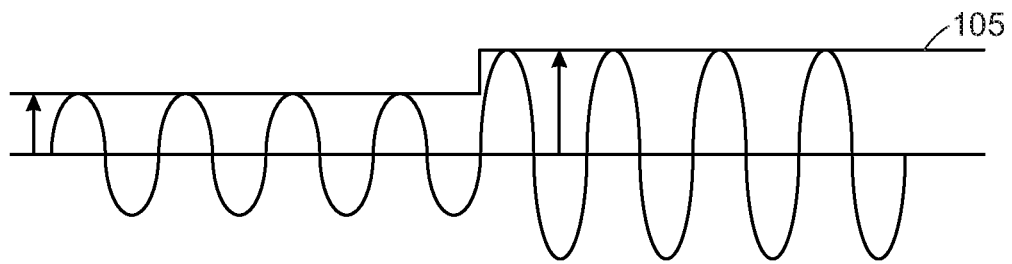
FIG. 3 illustrates an example of an output load feedforward signal, referenced in FIG. 1, which is analogous to the modulation envelope used in AM radio transmission.

Output load feedforward will modulate input current, thus defeating the purpose of the active filter, if implemented incorrectly. In, for example, a cryogenic cooler application, the cryocooler motor is driven by the cryocooler electronics, and the commanded stroke is provided by the cryocooler electronics. Therefore, the cryocooler electronics can provide a feedforward signal proportional to the commanded power draw of the cryocooler motor and drive electronics. This signal can be fed to the active filter as a variable ISENSE. The commanded stroke signal is analogous to the modulation envelope used in AM radio transmission, as illustrated in shown in FIG. 3 with a step function load change for clarity. It is the "'modulation envelope" shown in curve 105 that is to be used to provide output load feedforward, not the "carrier frequency." The "modulation envelope" has no "carrier frequency" information. Thus, the output load feedforward does not modulate the input current at the cryocooler drive frequency, and does not defeat the purpose of the ALF. In the pulsed laser application, the diode drivers are commanded by the laser electronics, and the pulsed pump current and firing rate are controlled by the laser electronics. Therefore, the laser electronics can provide a feedforward signal proportional to the pulsed pump current and firing rate.

Figure 4:
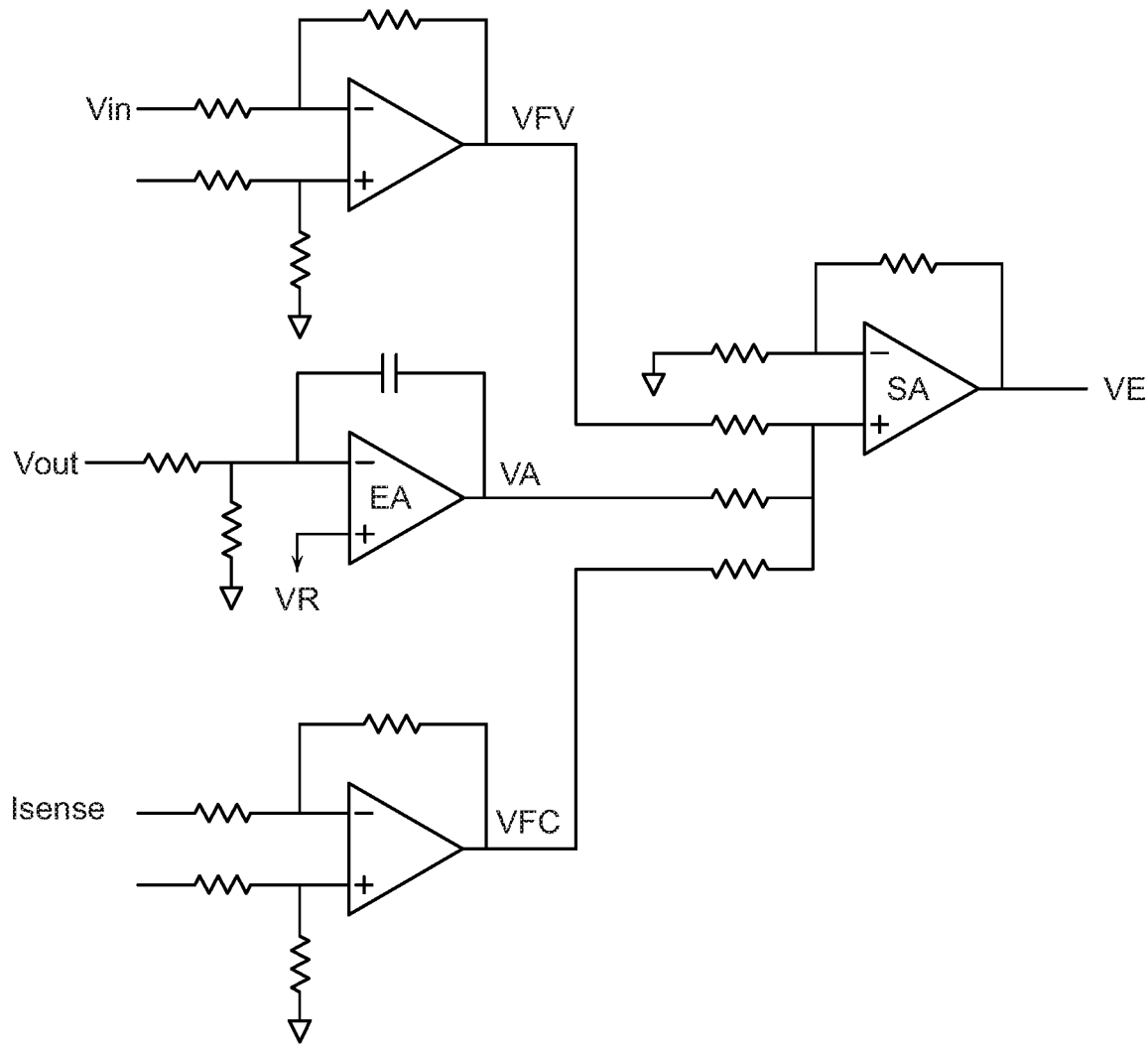
FIG. 4 includes a schematic diagram of circuitry to implement the error amplifier, summing amplifier, and feedforward signals, which are part of the PWM and control illustrated in FIG. 1.

FIG. 4 includes a schematic diagram of circuitry to implement the error amplifier, summing amplifier, and feedforward signals, which are part of the PWM and control 102 illustrated in FIG. 1. Referring to FIG. 4, a very slow voltage regulation error amplifier EA provides regulation of the output voltage Vout. A very slow error amplifier EA is used in order to not modulate input current as a function of output voltage ripple, thus VA does not change very rapidly. Input voltage feedforward (VFV) and output load feedforward (VFC) are added to provide very fast response to input voltage transients and output load transients to maintain output voltage regulation. Input voltage Vin is scaled appropriately to form the input voltage feedforward, VFV. The current sense signal Isense is scaled appropriately to form the output load feedforward, VFC. These two signals are summed in summing amplifier SA with the error amplifier output to create VE. VE is fed to the pulse width modulator (PWM) to control the input current. Since VFV and VFC are not integrated or filtered, they can change as rapidly as the input voltage or output load can change. VE can therefore change as rapidly as as the input voltage or output load, and can provide the control necessary to provide a regulated output voltage. In most if not all cases, the error amplifier internal to a PWM integrated circuit (IC) can be used as the summing amplifier.

Figure 5:
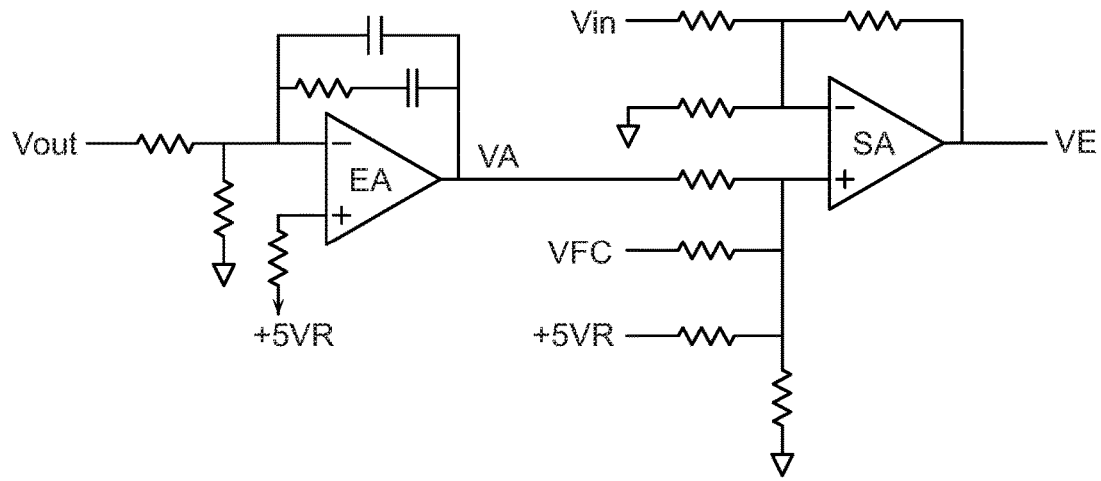
FIG. 5 includes a schematic diagram illustrating another implementation of circuitry to implement the error amplifier, summing amplifier, and feedforward signals, which are part of the PWM and control illustrated in FIG. 1.

FIG. 5 includes a schematic diagram illustrating another implementation of error amplifier, summing amplifier, and feedforward signals, which are part of the PWM and control 102 illustrated in FIG. 1. In most if not all cases, the error amplifier internal to a PWM integrated circuit (IC) can be used as the summing amplifier. For both FIG. 4 and FIG. 5, $$VE=VA-K1*VIN+K2*ISENSE+K3;$$

for which K1 provides the scaling factor for Vin, K2 provides the scaling factor for Isense, and K3 provides a DC offset. K1, K2, and K3 are optimized for the application. When optimized, there is little or no change in output voltage with a step function input voltage transient or step function output load transient. As can be seen, if input voltage Vin rises, VE drops, reducing input current to compensate; if ISENSE increases, VE increases, increasing input current to compensate. The amplifier labeled EA is the slow error amplifier, the amplifier labeled SA is the fast summing amplifier.

ALF breadboards have been designed, built, and tested. Breadboard test results have demonstrated that the ALF meets performance requirements in achieving a ripple attenuation of >30 dB with power throughput efficiency greater than 90%. A space qualified ALF can be packaged on a 6.5 inch square multiplayer circuit board 1.25 inch high and weigh less than 2.5 lbs. including an aluminum housing. If the filter is packaged with other cryocooler electronics in one housing, weight impact is less. ALF attenuation has been demonstrated at and greater than 32 dB, but this can be increased by increasing output capacitance, which would have some impact on weight and size.

The ALF utilizes a current mode control continuous current boost converter with a very low bandwidth control loop, with input voltage feedforward and output load feedforward, to provide a regulated input current and a regulated output voltage. It provides input ripple current attenuation of >30 dB (due to the input current regulation and slow voltage loop), maintains excellent output voltage regulation over line and load transients (due to the input voltage feedforward and output load feedforward), achieves >90% efficiency (the breadboard utilizes silicon carbide rectifiers to achieve >93% efficiency), and is small and light weight.

Figure 6:
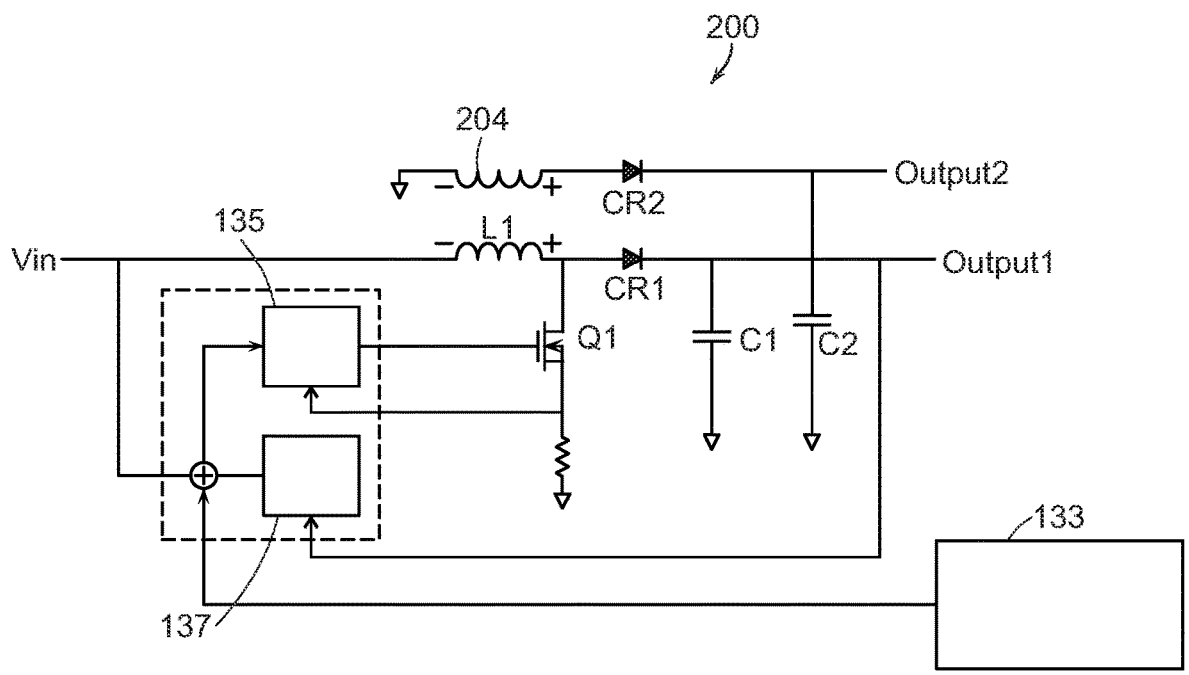
FIG. 6 includes a schematic diagram illustrating the multple-output non-isolated boost converter ALF of the present disclosure, according to some exemplary embodiments.

According to the present disclosure, the foregoing description of an ALF is applicable to a multiple-ouput boost converter ALF. FIG. 6 includes a schematic diagram illustrating the multple-output boost converter ALF of the present disclosure, according to some exemplary embodiments, including error amplifier 137, PWM 135, and connected to system electronics 133. Referring to FIG. 6, multiple-output ALF includes secondary windings 204 to provide multiple output power forms (Output 1 and Output 2). Only one secondary winding and output power form is shown for clarity, i.e., Output 2, but the concept extends to any number of multiple output power forms.

Continuing to refer to FIG. 6, during the time the power switch Q1 is on, ramp up of current in the primary of power inductor L1 is as previously described for the previously disclosed continuous current boost converter ALF 100. However, in the embodiment of FIG. 6, once the switch turns off, the primary winding of inductor L1 flies back due to back EMF to flow current into the output capacitor C1 for Output 1, and at the same time, the secondary windings 204 also fly back due to the back EMF, and can flow current into their respective output capacitors, such as into output capacitor C2 for Output 2. The inductor current is split between each of the outputs, and each of the secondary output power forms is regulated by virtue of the turns ratio of the inductor windings through the coupling of the inductor windings. The turns ratio of the inductor is set to provide the desired voltage at Output 2.

During the switch OFF time, the difference between the output voltage and the input voltage is impressed across the primary winding of the inductor (assuming diode VF=0 for clarity, where Vf is the forward voltage of the output rectifier diode CR1 during time toff while the inductor current is flowing through CR1), and the voltage across the secondary windings equals the voltage across the primary winding reflected through the inductor turns ratio according to the equations:

$$VLpri=Vin-Vout$$

where
VLpri is the voltage across the inductor primary during the time the switch transistor Q1 is off, Vin is the voltage input to the converter, and Vout is the voltage output from the converter, and $$VLsec = \frac{VLpri}{Npri} * Nsec;$$

where
VLsec is the voltage across the inductor secondary during the time the switch transistor Q1 is off, Npri is the number of turns in the inductor primary winding, and Nsec is the number of turns in the inductor secondary winding.

Thus, $$Vout2 = \frac{(Vin - Vout)}{Npri} * Nsec$$

assuming diode VF=0 for clarity. Therefore, since Output 1 is regulated, Output 2 is regulated by the turns ratio of the inductor.

It is seen that the voltage across the primary winding of inductor L1 is also a function of the voltage of the input power source. Thus, the regulation of the secondary output power form Output 2 is a function of the variation of the voltage of the input power source, and tight regulation of the output power form Output 2 is a challenge. However, if the variation of the input power source voltage is sufficiently small, or if the variation of the input power source voltage is sufficiently small compared to the output voltage, then the regulation of Output 2 voltage can be relatively tight. Note, however, that for any ALF with a constant current into the capacitor, and with a widely varying output current draw (i.e., significant ripple current), the difference between the capacitor input current and output load current is provided by the output filter capacitor, resulting in a significant ripple voltage across the capacitors. Thus, by definition and design, the ALF output voltages are not tightly regulated; there is significant variation (ripple or regulation) of the output power form voltages. More output capacitors can be used in parallel to reduce the ripple voltage in the output power forms, but at the expense of size, weight, and cost. It is also possible to arrange the rectification of the secondary output power form to eliminate the effect of the ALF input voltage Vin, but at the cost of significantly increased cost, size, and mass, for very little effective return. Since the intent of the use of the ALF is to minimize size, weight, and cost, the variation of the ALF output power form voltages is understood and accepted, and the electronics (diode drivers, motor drivers, etc.) that utilize the ALF output power forms are designed to regulate their respective outputs with the variation in their input power form voltages (ALF output power form voltages). Thus, the "loose" regulation of the secondary output power form Output 2 is expected and very acceptable.

Thus, according to the present disclosure, an ALF boost converter provides two or more output power forms, for which the time-varying load currents and/or pulsed load currents drawn from the multiple output power forms are not reflected back to the input power source. In the case of laser pump diode drivers, these devices draw high pulsed current from the input power buss. These can excessively degrade the power system. The ALF of the disclosure is a small, lightweight filter that filters out the pulsed currents, and provides a steady state DC current with very low ripple current reflected back to the input power buss.

As described above, electronic systems such as laser systems, may draw pulsed or time-varying current from the system power source. A laser may require large-amplitude pulsed diode array pump currents that reflect back to the input power source as pulsed input current, unless some means is used to filter the pulsed currents. As another example, certain cryocoolers typically draw significant ripple current at the operating frequency of the cryogenic cooler that reflect back to the input power source as input current unless some means is used to filter the ripple currents. In many cases, these pulsed or time-varying currents are not allowed to be drawn from the input power buss because they destabilize the input power buss voltage, causing significant buss voltage ripple, which can potentially degrade the performance of other electronics on the buss, particularly those managing low power sensor signals. In many cases, the pulsed currents exceed the maximum current capability of the power system.

Active line filters operating off a DC voltage buss and providing a DC current draw with very low ripple reflected back to the voltage source have been developed. These ALFs are capable of attenuating current ripple drawn from the buss by a minimum of, for example, 30 dB with power throughput efficiency greater than 90%, at significantly reduced size and weight over passive filtering. These ALFs provide regulation of the output voltage while controlling/regulating the input current to the DC current level required to maintain the regulation of the average of the output voltage. However, these ALFs are designed to operate with loads that draw pulsed or time-varying currents continuously in regularly spaced time periods, and there is significant latitude in the output voltage regulation and output voltage ripple, and the DC input current level is not limited or constrained, except, normally, by the maximum output voltage of the error amplifier and the converter control-to-output-current gain $K=\delta Io/\delta Va$, and there is significant variability in the value of the regulated input current.

However, there are some electronic systems, some laser systems in particular, for which the DC input current is limited to a particular amplitude, the output voltage regulation must be very tight, and the load currents are not pulsed or time-varying in uniform time periods, and/or load currents are not continuous. For example, some pulsed high-energy lasers may require pump diodes to be pumped with a series of pulses, then off for a time, for which the output voltage of the ALF must be tightly regulated due to voltage constraints. The conventional ALFs will not provide the required performance.

Conventional ALFs provide regulation of the output voltage using a very slow output voltage control loop while controlling/regulating the input current to the DC current level required to maintain the regulation of the average of the output voltage. The new ALFs of the present disclosure are designed to be used in electronics systems, some laser systems in particular, for which the DC input current is limited to a particular amplitude, the output voltage regulation must be very tight, and the output pulsed power can be drawn at irregular rates, and/or load currents are not continuous. For example, the pulsed high-energy lasers described above that require pump diodes to be pumped with a series of pulses, then off for a time, and for which the output voltage of the ALF must be tightly regulated due to voltage constraints. This new ALF configuration uses a dual control loop configuration, in which the boost converter regulates the output voltage by means of an outer voltage regulation loop, and the boost converter directly regulates the input current to a set specific DC level using a fast inner input current regulation loop, for which the ALF input current is regulated to the set specific DC level set either internally or eternally by the laser control electronics. The outer regulation loop may regulate the output voltage by means of a voltage "ripple regulator" circuit or a linear regulation control loop.

In this configuration of the exemplary embodiments, the ALF charges energy storage capacitors to the regulated output voltage while tightly regulating the ALF input current to a set specific level, then shuts off, leaving the capacitors charged to the required voltage. The pulsed load or loads discharge the energy storage capacitors, then shut off. The ALF recharges the energy storage capacitors to the regulated output voltage prior to the occurrence of the next pulsed load, and the cycle repeats. If the input current draw is controlled by the laser control electronics, the ALF can complete the recharge of the energy storage capacitors at the same time the next pulsed load occurs, such that the input current draw is continuous, and the input current draw is minimized, which is ideal for use with power systems having limited capability. It should be noted that, while the ALFs of the exemplary embodiments are described herein as being part of a laser power system, the present disclosure is not limited to that configuration.

Figure 7:
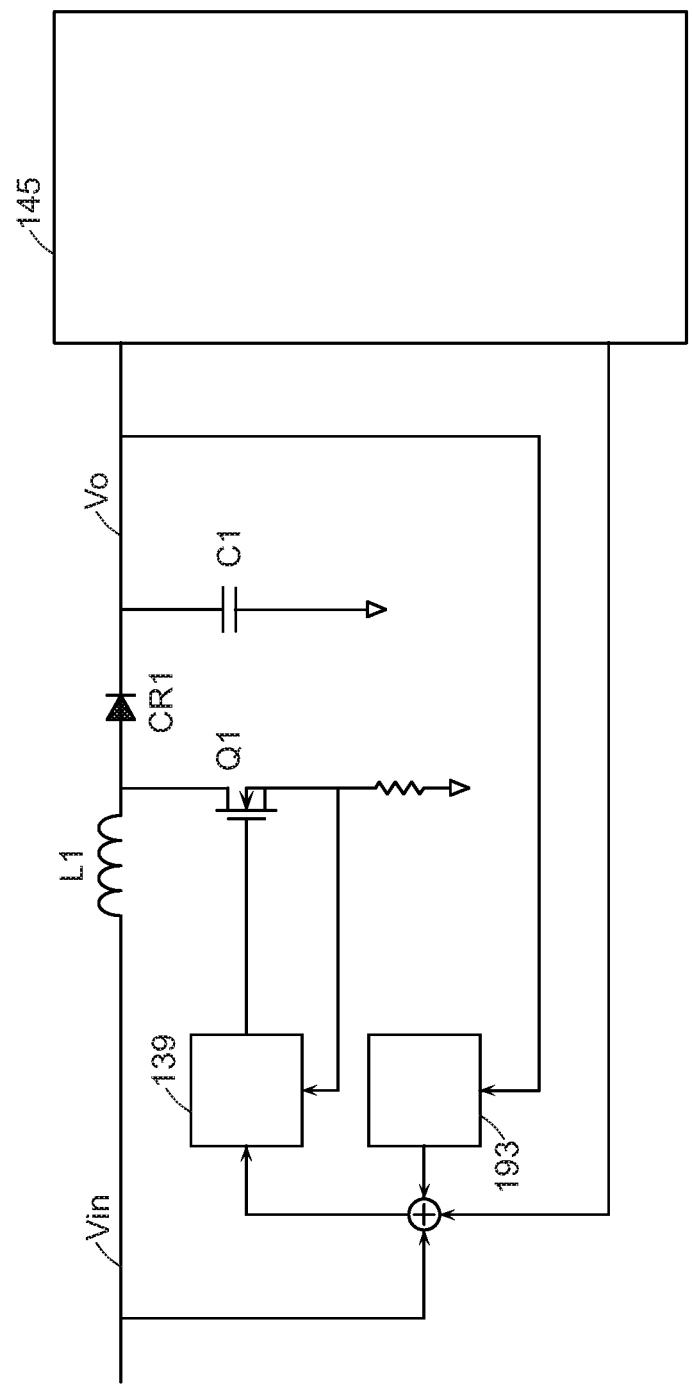
FIG. 7 includes a schematic diagram illustrating a prior ALF boost converter, according to the prior art.

FIG. 7 includes a schematic diagram of an active line filter boost converter, like FIG. 1, according to the prior art, but with more detail of the PWM and control functions, to illustrate the differences between an ALF of the prior art and the ALF of the present disclosure. Referring to FIG. 7, the ALF includes error amplifier 143 and PWM 139, and is connected to system electronics 133. The ALF utilizes a high switching frequency continuous current boost converter implemented using current mode control, with a very low bandwidth control loop, with input voltage feedforward and output load feedforward, to provide an input current regulated to a DC level, with greatly attenuated ripple current, as illustrated in FIGS. 1 and 2. The error amplifier senses the ALF output voltage, compares it to a reference, and sets its output voltage to regulate the output voltage of the ALF. The error amplifier output is summed with the input voltage feedforward and the output load feedforward by means of the summing amplifier, much like that as illustrated in FIGS. 4 and 5, and the resulting signal is fed to the PWM. Thus, the ALF output voltage is regulated while drawing an input current regulated to a DC level with very little ripple on the DC input current.

Figure 8A:
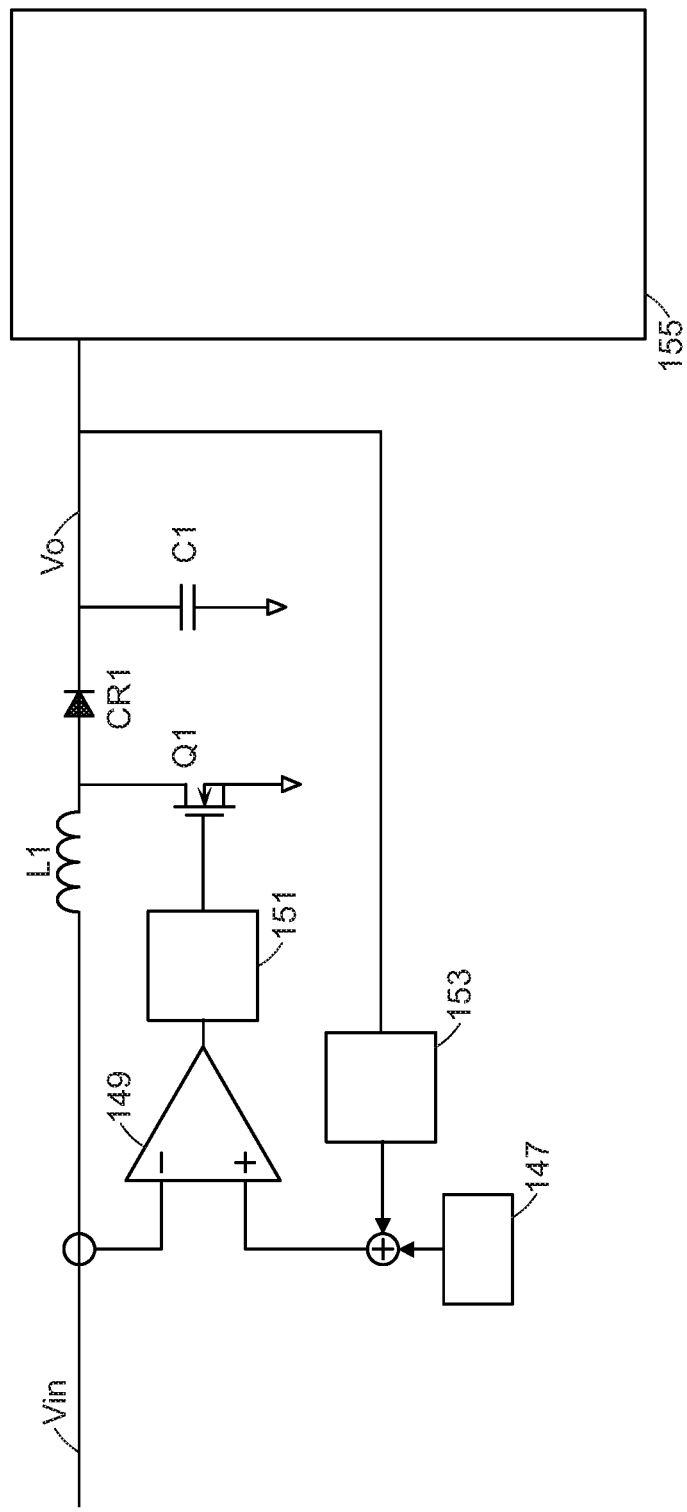
FIG. 8A includes a schematic diagram illustrating an ALF boost converter of the present disclosure, which regulates input current to a set DC level, according to some exemplary embodiments.

FIG. 8A includes a schematic diagram illustrating an active line filter continuous current boost converter, according to some exemplary embodiments, including error amplifier 149, PWM 151, output voltage regulation control 153, and voltage reference 147, and connected to laser electronics 155. Referring to FIG. 8A, the ALF utilizes a high switching frequency continuous current boost converter implemented using current mode control, with a very low bandwidth control loop to provide an input current regulated to a set specific DC level, with greatly attenuated ripple current. The error amplifier senses the ALF input current, compares it to a reference, and sets its output voltage to the PWM to regulate the input current of the ALF to a set specific DC level. The output of the output voltage regulation control circuit is summed with the reference voltage to provide regulation of the output voltage. Alternatively, the output of the output voltage regulation control circuit may pull the reference voltage fed to the error amplifier low to command zero input current, to provide regulation of the output voltage. Thus, the ALF output voltage is regulated while drawing an input current regulated to a set specific DC level with very little ripple on the DC input current, that set specific DC level set either internally or eternally by the system control electronics, such as the LASER Control Electronics illustrated in FIG. 8A. Furthermore, the input current never exceeds the set specific commanded DC level, thus providing a 'current limit' function. The outer regulation loop may regulate the output voltage by means of a voltage "ripple regulator" circuit or a linear regulation control loop.

Figure 8B:
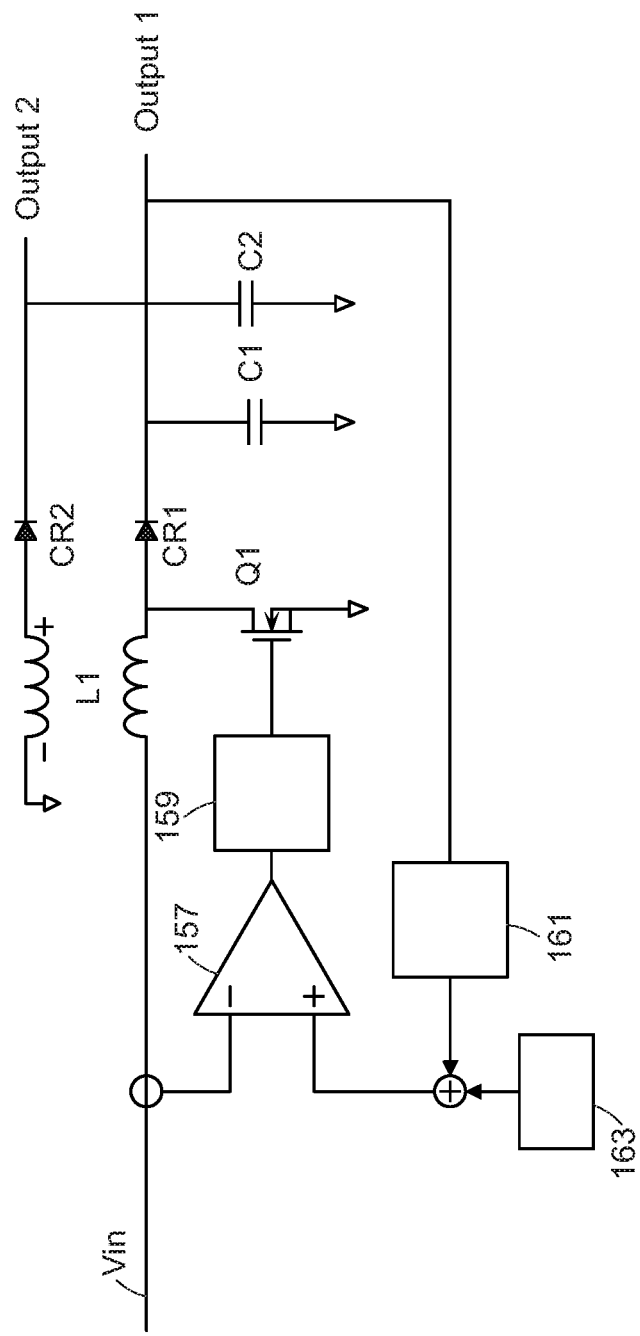
FIG. 8B includes a schematic diagram illustrating a multple-output non-isolated boost converter ALF of the present disclosure, which regulates input current to a set DC level, according to some exemplary embodiments.

FIG. 8B includes a schematic diagram illustrating the multple-output boost converter ALF of the present disclosure, according to some exemplary embodiments, for which the input current is regulated to a set specific DC level, and which includes error amplifier 149, PWM 151, output voltage regulation control 153, and voltage reference 147. Operationlly this ALF is the same as that of FIG. 8A, except one or more secondary windings is added to the inductor L1, as was described above in connection with FIG. 6. Referring to FIG. 8B, the multiple-output ALF includes secondary windings to provide multiple output power forms (Output 1 and Output 2). Only one secondary winding and output power form is shown for clarity, i.e., Output 2, but the concept extends to any number of multiple output power forms. In the embodiment of FIG. 8B, once the switch turns off, the primary winding of inductor L1 flies back due to back EMF to flow current into the output capacitor C1 for Output 1, and at the same time, the secondary windings also fly back due to the back EMF, and can flow current into their respective output capacitors, such as into output capacitor C2 for Output 2. The inductor current is split between each of the outputs, and each of the secondary output power forms is regulated by virtue of the turns ratio of the inductor windings through the coupling of the inductor windings. The turns ratio of the inductor is set to provide the desired voltage at Output 2.

Figure 9:
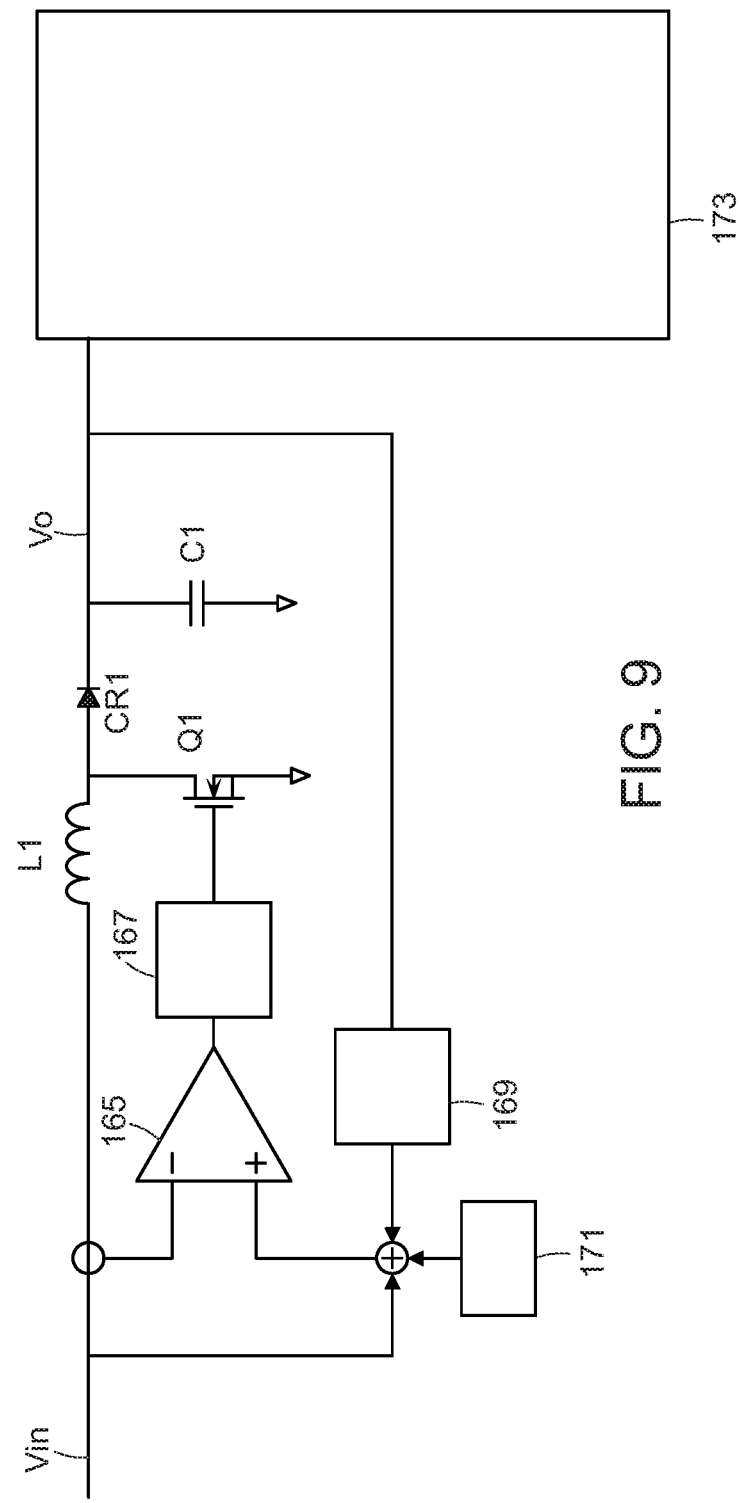
FIG. 9 includes a schematic diagram illustrating another ALF boost converter, with input voltage feedforward, which regulates input current to a set DC level, according to some exemplary embodiments.

FIG. 9 includes a schematic diagram illustrating another active line filter continuous current boost converter with input voltage feedforward, according to some exemplary embodiments, including error amplifier 165, PWM 167, output voltage regulation control 169, and voltage reference 171, and connected to laser electronics 173. Referring to FIG. 9, the ALF utilizes a high switching frequency continuous current boost converter implemented using current mode control, with a very low bandwidth control loop to provide an input current regulated to a set specific DC level, with greatly attenuated ripple current, just as the ALF of FIG. 8, but with input voltage feedforward added to provide very fast response to input voltage transients to maintain output voltage regulation to within acceptable levels.

Figure 10:
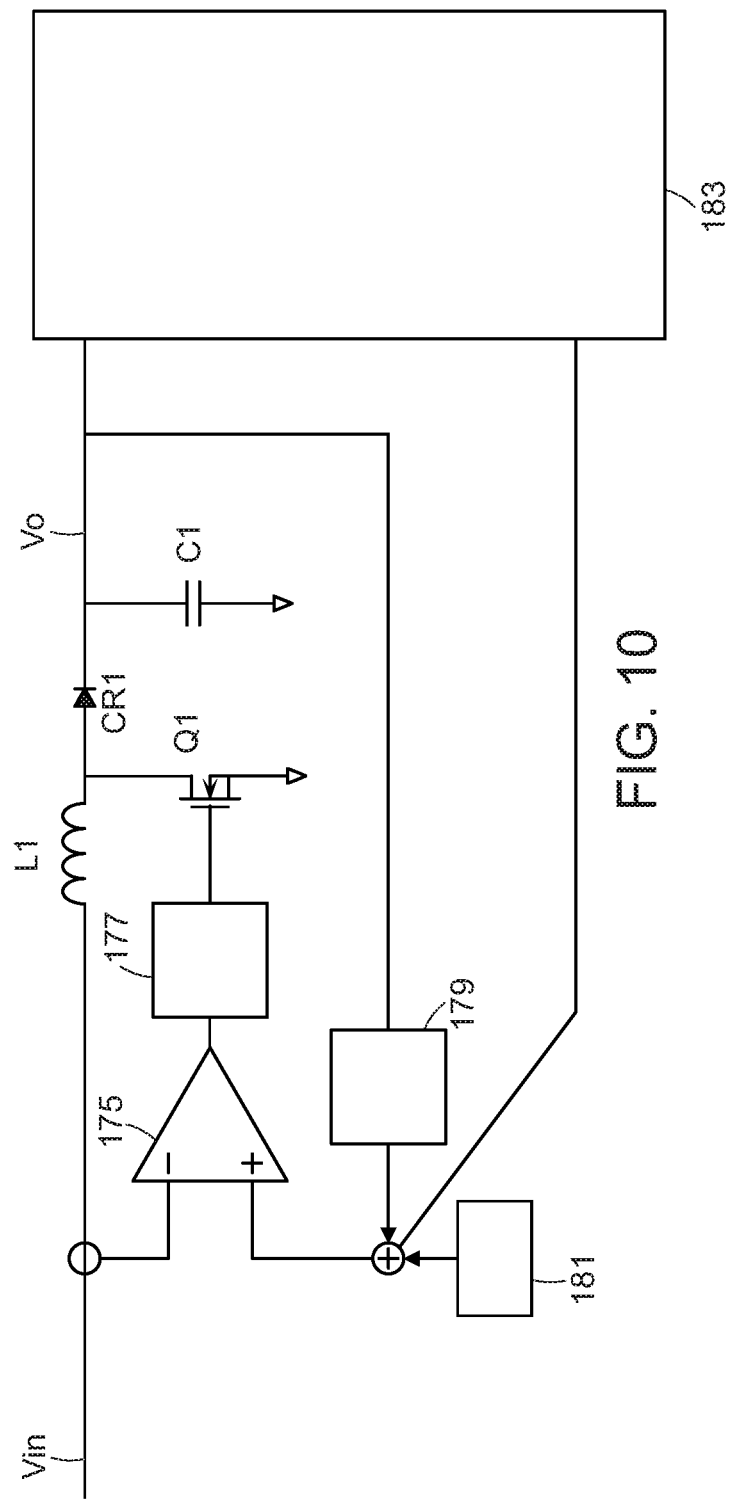
FIG. 10 includes a schematic diagram illustrating another ALF boost converter, with output load feedforward, which regulates input current to a set DC level, according to some exemplary embodiments.

FIG. 10 includes a schematic diagram illustrating another active line filter continuous current boost converter with output load feedforward, according to some exemplary embodiments, including error amplifier 175, PWM 177, output voltage regulation control 179, and voltage reference 181, and connected to laser electronics 183. Referring to FIG. 10, the ALF utilizes a high switching frequency continuous current boost converter implemented using current mode control, with a very low bandwidth control loop to provide an input current regulated to a set specific DC level, with greatly attenuated ripple current, just as the ALF of FIG. 8, but with output load feedforward added to provide very fast response to output load transients to maintain output voltage regulation to within acceptable levels.

Figure 11:
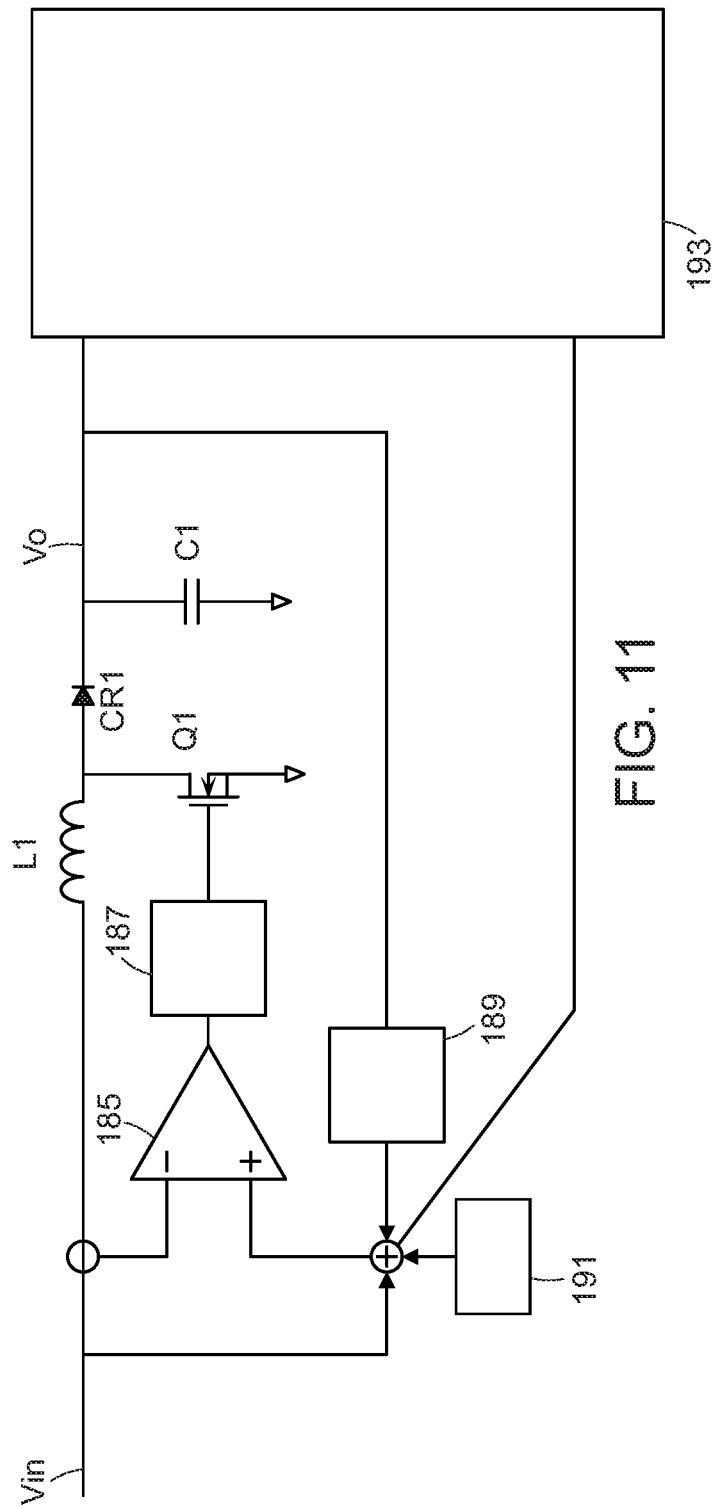
FIG. 11 includes a schematic diagram illustrating another ALF boost converter, with input feedforward and output load feedforward, which regulates input current to a set DC level, according to some exemplary embodiments.

FIG. 11 includes a schematic diagram illustrating another active line filter continuous current boost converter with input voltage feedforward and output load feedforward, according to some exemplary embodiments, including error amplifier 185, PWM 187, output voltage regulation control 189, and voltage reference 191, and connected to laser electronics 193. Referring to FIG. 11, the ALF utilizes a high switching frequency continuous current boost converter implemented using current mode control, with a very low bandwidth control loop to provide an input current regulated to a set specific DC level, with greatly attenuated ripple current, just as the ALF of FIG. 8, but with input voltage feedforward and output load feedforward added to provide very fast response to input voltage transients and output load transients to maintain output voltage regulation to within acceptable levels.

Figure 12:
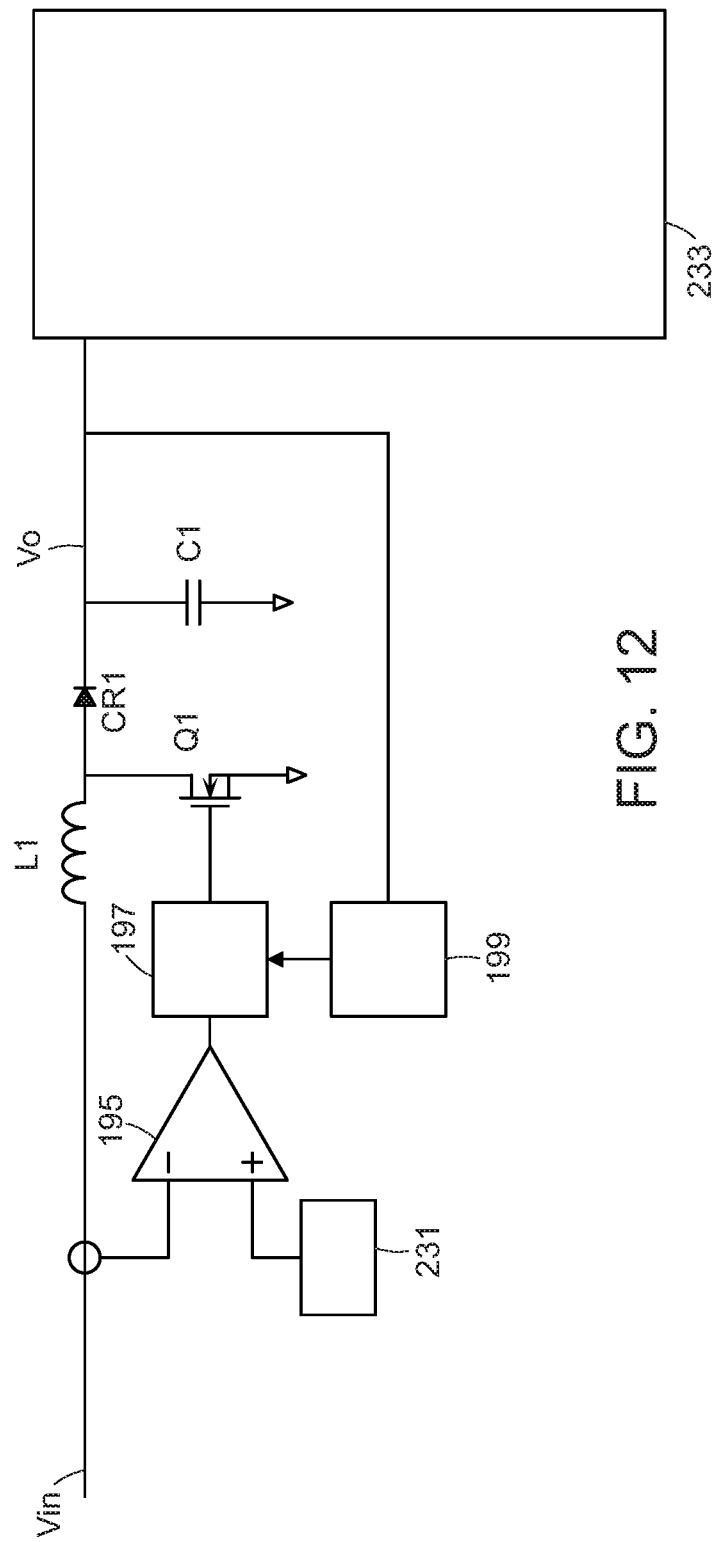
FIG. 12 includes a schematic diagram illustrating another ALF boost converter, with an alternate control configuration in which the output voltage regulation control circuit controls or shuts off the pulse width modulator (PWM) directly, which regulates input current to a set DC level, according to some exemplary embodiments.

FIG. 12 includes a schematic diagram illustrating another active line filter continuous current boost converter with an alternate control configuration in which the output voltage regulation control circuit controls or shuts off the pulse width modulator (PWM) directly, according to some exemplary embodiments, including error amplifier 195, PWM 197, output voltage regulation control 199, and voltage reference 231, and connected to laser electronics 233. Referring to FIG. 12, the ALF utilizes a high switching frequency continuous current boost converter implemented using current mode control, with a very low bandwidth control loop to provide an input current regulated to a set specific DC level, with greatly attenuated ripple current, just as the ALF of FIG. 8, but with an alternate control configuration in which the output voltage regulation control circuit controls or shuts off the pulse width modulator (PWM) directly once the output capacitor bank is fully recharged, rather than changing the reference voltage used for regulation of the input current.

Figure 13A:
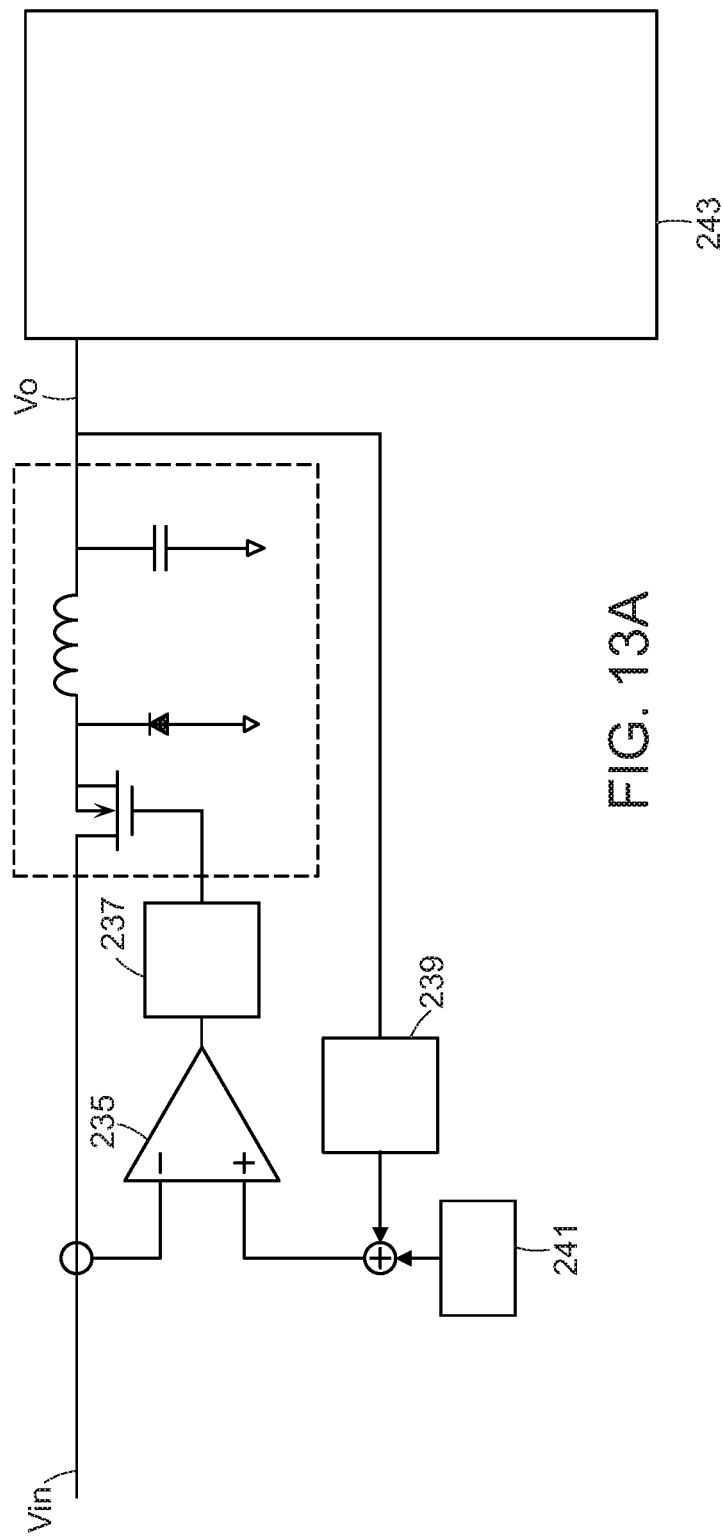
FIG. 13A includes a schematic diagram illustrating an ALF buck converter, which regulates input current to a set DC level, according to some exemplary embodiments.

FIG. 13A includes a schematic diagram illustrating an active line filter buck converter, according to some exemplary embodiments, including error amplifier 185, PWM 187, output voltage regulation control 189, and voltage reference 191, and connected to laser electronics 193. Referring to FIG. 13A, the ALF utilizes a high switching frequency continuous current buck converter implemented using current mode control, with a very low bandwidth control loop to provide an input current regulated to a set specific DC level, with greatly attenuated ripple current. The error amplifier senses the ALF input current, compares it to a reference, and sets its output voltage to the PWM to regulate the input current of the ALF to a set specific DC level. The output of the output voltage regulation control circuit is summed with the reference voltage to provide regulation of the output voltage. Alternatively, the output of the output voltage regulation control circuit may pull the reference voltage fed to the error amplifier low to command zero input current, to provide regulation of the output voltage. Thus, the ALF output voltage is regulated while drawing an input current regulated to a set specific DC level with very little ripple on the DC input current, that set specific DC level set either internally or externally by the system control electronics, such as the LASER Control Electronics illustrated. Furthermore, the input current never exceeds the set specific commanded DC level, thus providing a current limit function. The outer regulation loop may regulate the output voltage by means of a voltage ripple regulator circuit or a linear regulation control loop. The buck converter ALF is useful for applications for which the ALF output voltage is less than the input voltage. However, the input current will contain ripple (pulsed current) at the converter switching frequency, which must be filtered by an input filter, losing one advantage of the continuous current boost converter, for which the input curent is a true DC current having very low ripple current.

Figure 13B:
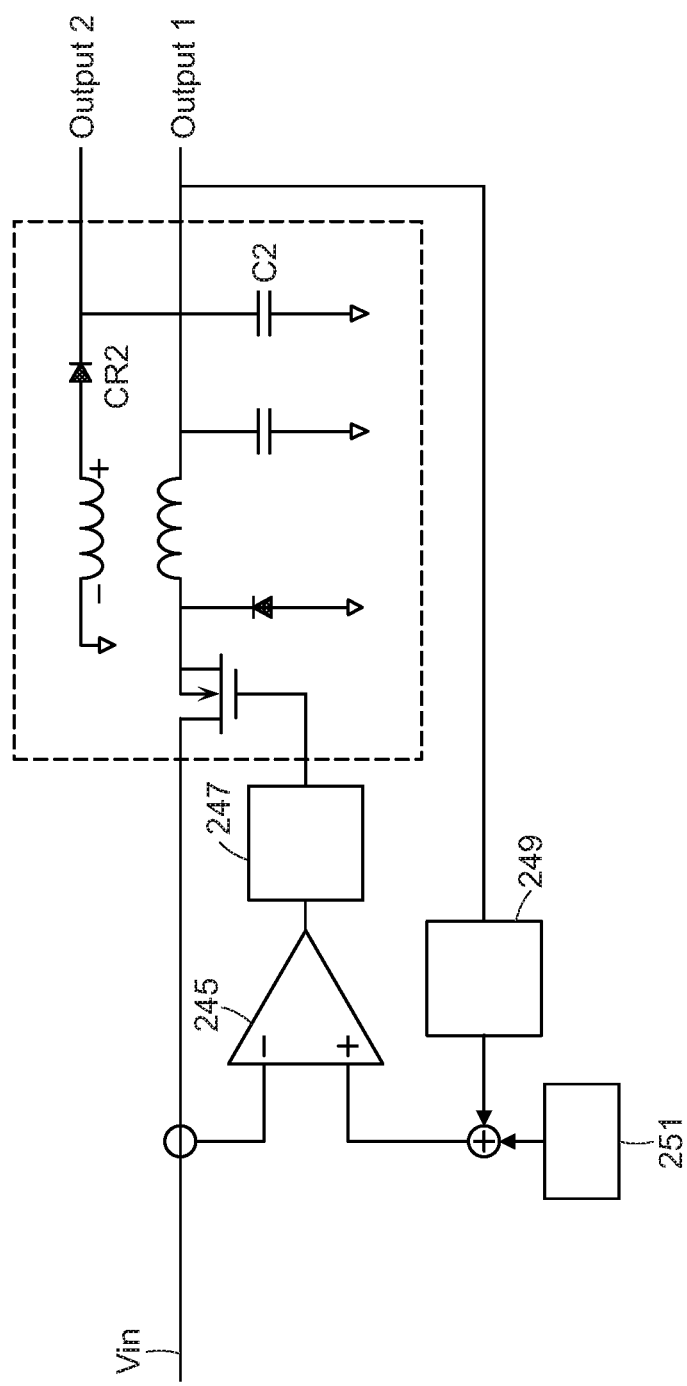
FIG. 13B includes a schematic diagram illustrating a multiple-output ALF buck converter, which regulates input current to a set DC level, according to some exemplary embodiments.

FIG. 13B includes a schematic diagram illustrating the multple-output buck converter ALF of the present disclosure, according to some exemplary embodiments, for which the input current is regulated to a set specific DC level, including error amplifier 245, PWM 247, output voltage regulation control 249, and voltage reference 251. Referring to FIG. 13B, the multiple-output ALF includes secondary windings to provide multiple output power forms (Output 1 and Output 2). Only one secondary winding and output power form is shown for clarity, i.e., Output 2, but the concept extends to any number of multiple output power forms. In the embodiment of FIG. 13B, once the switch turns off, the primary winding of inductor L1 flies back due to back EMF to flow current into the output capacitor C1 for Output 1, and at the same time, the secondary windings also fly back due to the back EMF, and can flow current into their respective output capacitors, such as into output capacitor C2 for Output 2. The inductor current is split between each of the outputs, and each of the secondary output power forms is regulated by virtue of the turns ratio of the inductor windings through the coupling of the inductor windings. The turns ratio of the inductor is set to provide the desired voltage at Output 2.

Figure 14:
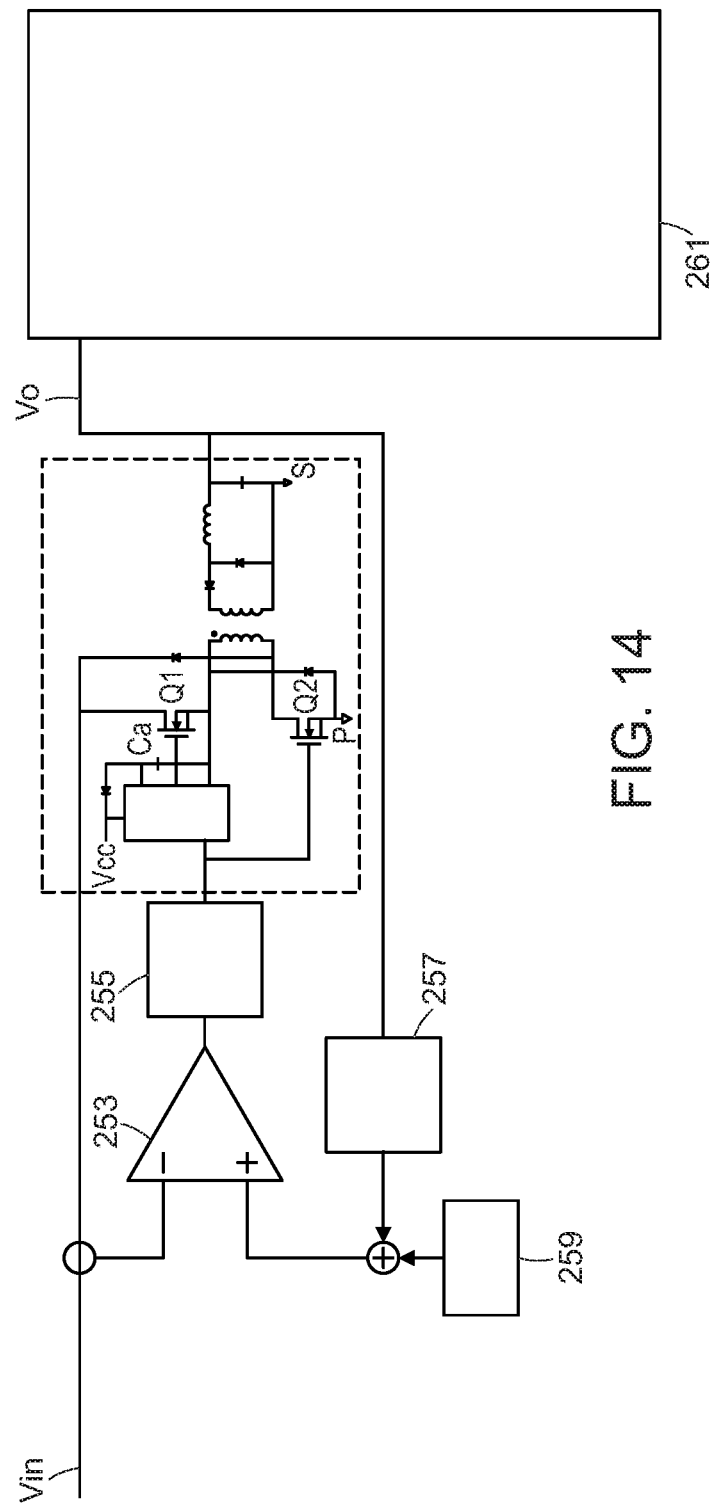
FIG. 14 includes a schematic diagram illustrating an ALF two-transistor forward converter, which regulates input current to a set DC level, according to some exemplary embodiments.

FIG. 14 includes a schematic diagram illustrating an active line filter two-transistor forward converter, according to some exemplary embodiments, including error amplifier 253, PWM 255, output voltage regulation control 257, and voltage reference 259, and connected to laser electronics 261. Referring to FIG. 14, the ALF utilizes a high switching frequency two-transistor forward converter implemented using current mode control, with a very low bandwidth control loop to provide an input current regulated to a set specific DC level, with greatly attenuated ripple current. The error amplifier senses the ALF input current, compares it to a reference, and sets its output voltage to the PWM to regulate the input current of the ALF to a set specific DC level. The output of the output voltage regulation control circuit is summed with the reference voltage to provide regulation of the output voltage. Alternatively, the output of the output voltage regulation control circuit may pull the reference voltage fed to the error amplifier low to command zero input current, to provide regulation of the output voltage. Thus, the ALF output voltage is regulated while drawing an input current regulated to a set specific DC level with very little ripple on the DC input current, that set specific DC level set either internally or eternally by the system control electronics, such as the LASER Control Electronics illustrated. Furthermore, the input current never exceeds the set specific commanded DC level, thus providing a current limit function. The outer regulation loop may regulate the output voltage by means of a voltage ripple regulator circuit or a linear regulation control loop. The two-transistor forward converter ALF is useful for applications for which the ALF output voltage must be transformer isolated from the input power. However, the input current will contain ripple (pulsed current) at the converter switching frequency, which must be fitlered by an input filter, losing one advantage of the continuous current boost converter, for which the input curent is a true DC current having very low ripple current, but for which no isolation is provided.

Figure 15:
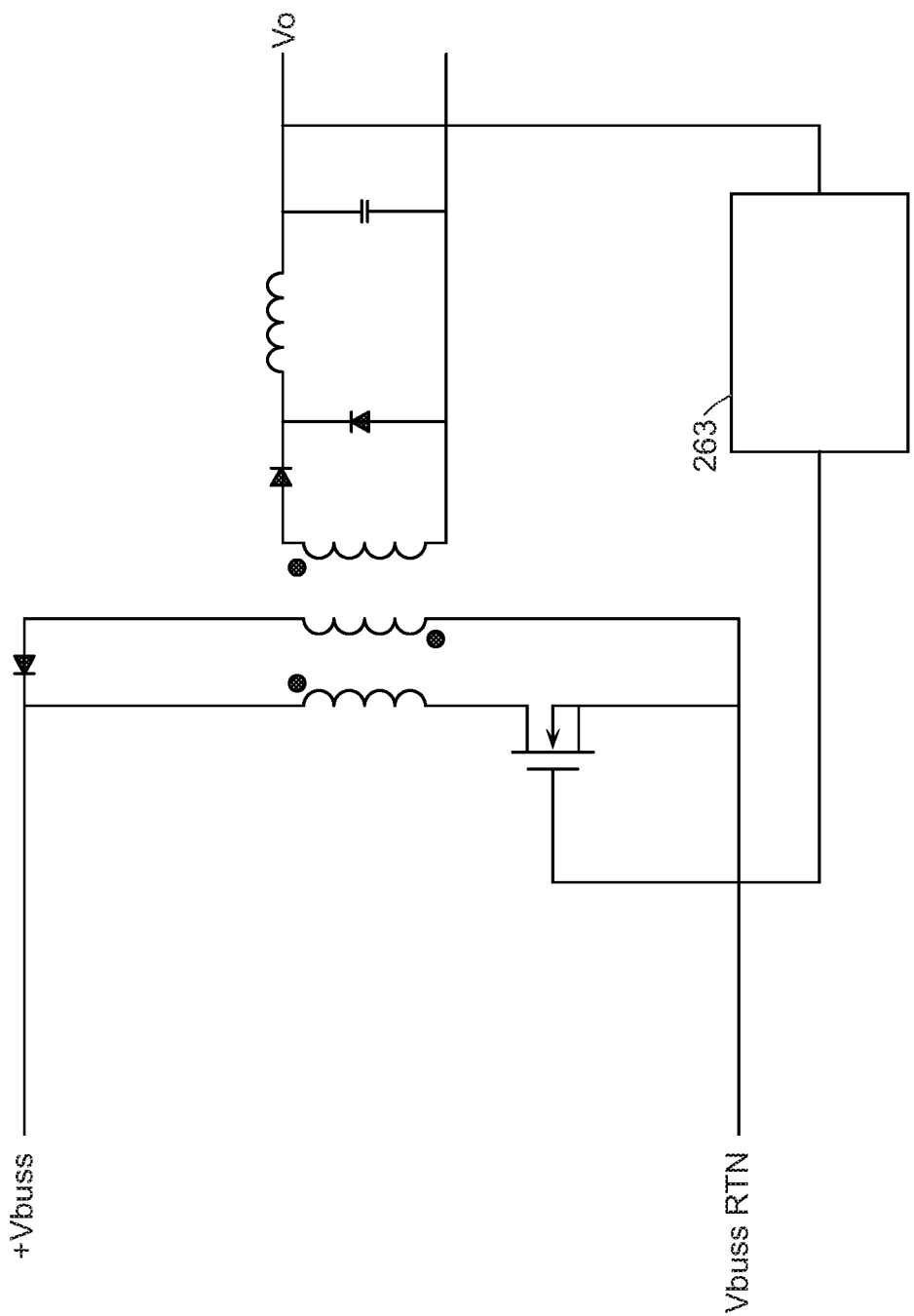
FIG. 15 includes a schematic diagram illustrating a single-transistor forward converter, which could be used as an ALF which regulates input current to a set DC level, according to some exemplary embodiments.

FIG. 15 includes a schematic diagram illustrating a single-transistor forward converter which could be utilized as an isolated active line filter according to some exemplary embodiments, including PWM 263. Referring to FIG. 15, the ALF utilizes a high switching frequency single-transistor forward converter implemented using current mode control, with a very low bandwidth control loop to provide an input current regulated to a set specific DC level, with greatly attenuated ripple current. Operation is very similar to that of the ALF of FIG. 14.

Figure 16:
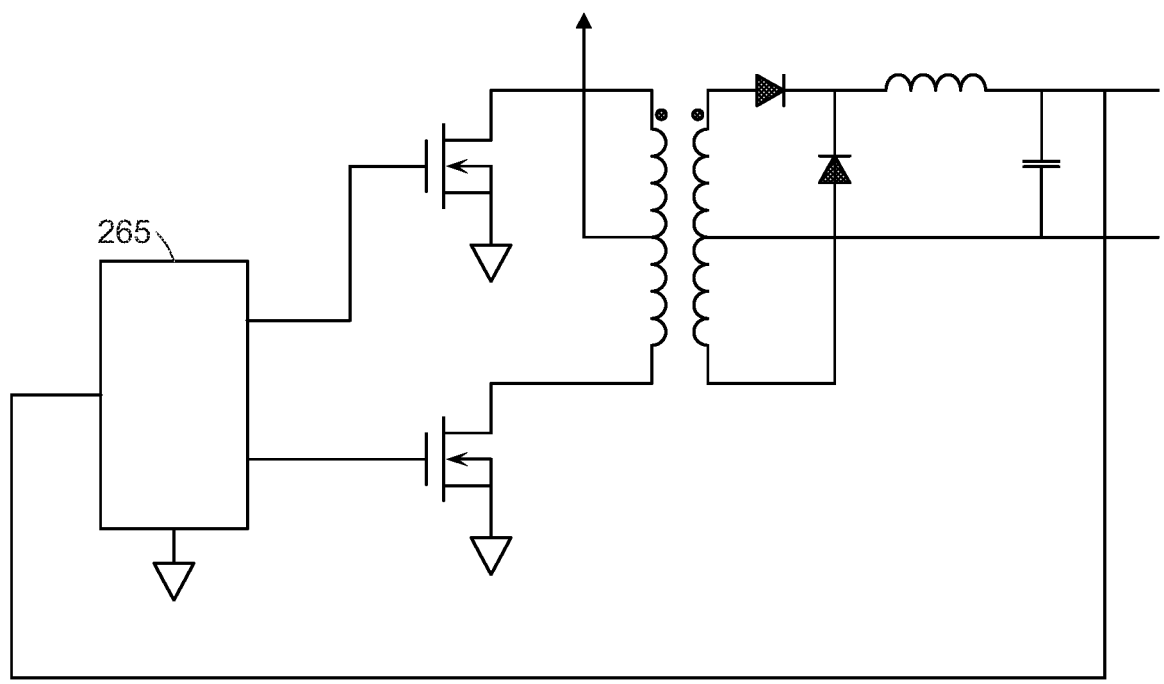
FIG. 16 includes a schematic diagram illustrating a push-pull converter, which could be used as an ALF which regulates input current to a set DC level, according to some exemplary embodiments.

FIG. 16 includes a schematic diagram illustrating a push-pull converter which could be utilized as an isolated active line filter according to some exemplary embodiments, including PWM 265. Referring to FIG. 16, the ALF utilizes a high switching frequency push-pull converter implemented using current mode control, with a very low bandwidth control loop to provide an input current regulated to a set specific DC level, with greatly attenuated ripple current. Operation is very similar to that of the ALF of FIG. 14.

Figure 17:
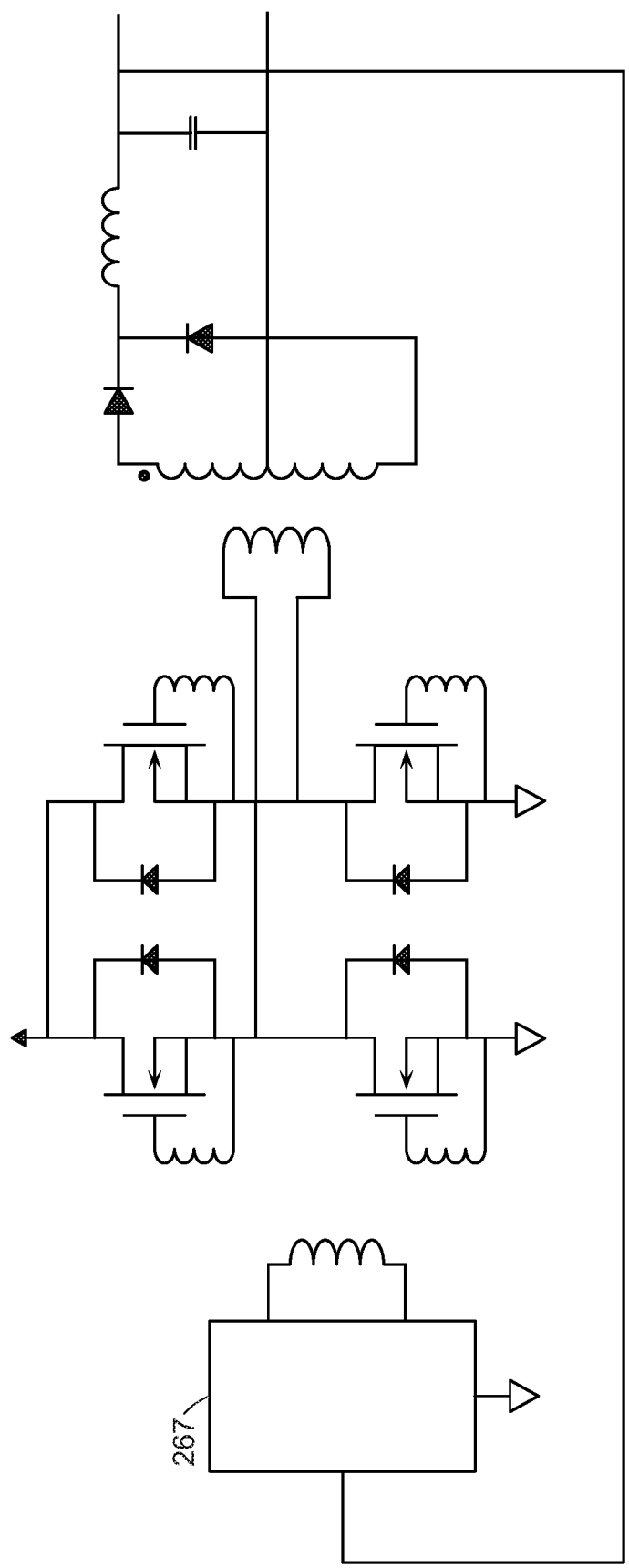
FIG. 17 includes a schematic diagram illustrating a full-bridge converter, which could be used as an ALF which regulates input current to a set DC level, according to some exemplary embodiments.

FIG. 17 includes a schematic diagram illustrating a full-bridge converter which could be utilized as an isolated active line filter according to some exemplary embodiments, including PWM 267. Referring to FIG. 17, the ALF utilizes a high switching frequency full-bridge converter implemented using current mode control, with a very low bandwidth control loop to provide an input current regulated to a set specific DC level, with greatly attenuated ripple current. Operation would be very similar to that of the ALF of FIG. 14.

According to the present disclosure, an active line filter (ALF) is an active filter that provides attenuation of the power line ripple current (or pulsed current) drawn from the ALF output, such that the ripple current (or pulsed current) reflected back to the power source (power line) is greatly attenuated. The ALF is configured as a low pass LC filter. The ALF provides the function of a low pass LC filter with significantly reduced size and weight, reduced cost, and improved performance over an equivalent passive LC power line filter.

According the present disclosure, an ALF regulates input current to fixed DC level set by the error amplifier output. Current mode control (boost) converter controls input current on a pulse-by-pulse basis, thus providing input current regulation to a DC level set by the error amplifier. A very low bandwidth output voltage regulation control loop is used to reduce or eliminate response to output voltage ripple. The error amplifier provides a slowly changing DC level.

Input voltage feedforward and output load feedforward are added to provide very fast response to input voltage transients and output load transients. Output voltage regulation is maintained, added to the output of the error amplifier by a summing amplifier. Output load feedforward is provided by system control electronics. For example, for a cryocooler application, the Stroke command (the envelope of amplitude modulated drive signal) may be used for the output load feedforward signal.

The present disclosure is directed to the application of a current mode control non-isolated converter with a very low bandwidth control loop, with input voltage feedforward and output load feedforward, to provide a regulated input current, with multiple outputs. The present disclosure is also directed to the application of a current mode control converter with a very low bandwidth control loop, with input voltage feedforward and output load feedforward, to provide an input current regulated to a set specific DC level, thus not only providing an input current drawn from the power source having greatly attenuated ripple current, but also providing an input current draw that never exceeds the set specific DC level, thus never exceeding the current capability of the power source.

In some exemplary embodiments, the ALF utilizes a current mode control continuous current boost converter with a very low bandwidth control loop, with input voltage feedforward and output load feedforward, to provide a regulated input current and a regulated output voltage. It provides input ripple current attenuation of >30 dB (due to the input current regulation and slow voltage loop), maintains excellent output voltage regulation over line and load transients (due to the input voltage feedforward and output load feedforward), achieves >90% efficiency (the breadboard utilizes silicon carbide rectifiers to achieve >93% efficiency), and is small and light weight. The ALF utilizes a high switching frequency converter implemented using current mode control, with a very low bandwidth control loop to provide an input current regulated to a DC level, with greatly attenuated ripple current.

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. An active line filter (ALF) with multiple outputs, comprising:
   a first output providing a first output power form having a first output current for charging a first energy storage capacitor to a first output voltage for storing energy to be provided to a first load, the first output power form being coupled to a first winding on an inductive element;
   a second output providing a second output power form having a second output current for charging a second energy storage capacitor to a second output voltage for storing energy to be provided to a second load, the second output power form being coupled to a second winding on the inductive element, such that the first and second output power forms are coupled via the inductive element;
   an input for receiving an input power form having an input current and an input voltage;
   a pulse-width modulator (PWM) for providing a PWM output signal controlling timing of switching of a transistor to control application of the input voltage of the input power form to the first winding of the inductive element; and
   an error amplifier receiving a signal indicative of the first output voltage and generating an error amplifier output signal.

2. The ALF of claim 1, wherein the ALF comprises a non-isolated converter.

3. The ALF of claim 1, further comprising a summing circuit for summing at least two summed signals to generate a summed output signal, the at least two summed signals including the input voltage of the input power form and the error amplifier output signal.

4. A method of providing power in an active line filter (ALF) with multiple outputs, comprising:
   providing a first output power form having a first output current for charging a first energy storage capacitor to a first output voltage for storing energy to be provided to a first load, the first output power form being coupled to a first winding on an inductive element;
   providing a second output power form having a second output current for charging a second energy storage capacitor to a second output voltage for storing energy to be provided to a second load, the second output power form being coupled to a second winding on the inductive element, such that the first and second output power forms are coupled via the inductive element;
   receiving an input power form having an input current and an input voltage;
   controlling timing of switching of a transistor with a pulse-width modulator (PWM) output signal to control application of the input voltage of the input power form to the first winding of the inductive element; and
   receiving a signal indicative of the first output voltage and generating an error amplifier output signal.

5. The method of claim 4, wherein the ALF comprises a non-isolated converter.

6. The method of claim 4, further comprising summing at least two summed signals to generate a summed output signal, the at least two summed signals including the input voltage of the input power form and the error amplifier output signal.

* * * * *